Patented Aug. 1, 1939

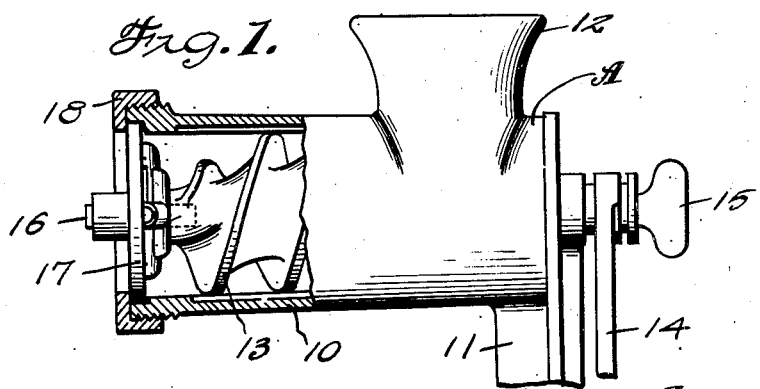
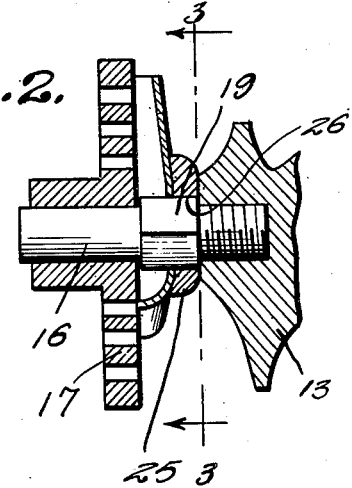
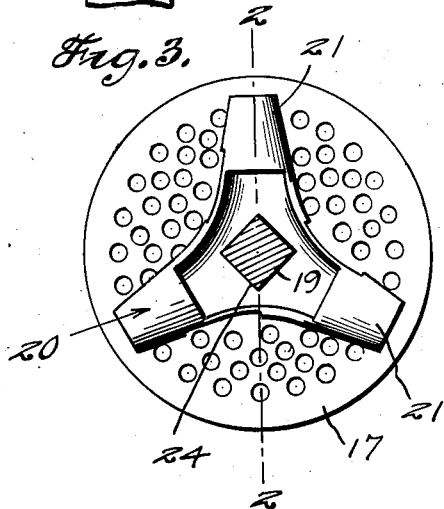
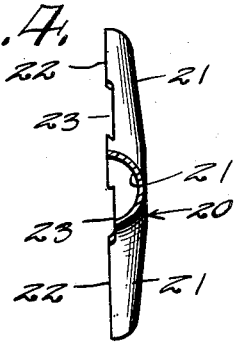
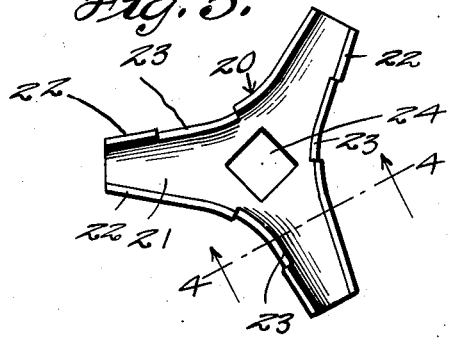

2,168,245

UNITED STATES PATENT OFFICE 2,168,245

KNIFE FOR MEAT CHOPPERS

William R. Rush and Raymond W. Rush, Mulberry, Kans.

Application July 18, 1938, Serial No. 219,871

1 Claim. (Cl. 146—189)

The invention relates to a meat grinding machine and more especially to a cutter or knife for meat choppers.

The primary object of the invention is the provision of a cutter or knife of this character, wherein the same is made from a single blank cut and bent to effect multiple double cutting edge blades which are adapted to bear against the inner surface of a perforated plate to properly cut the meat before being forced through the perforations in the plate and by reason of the formation of the blades, these at the cutting edges being of uniform thickness, assures evenness in the wear, particularly by reason of the manner of pressure exerted upon the cutter or knife and thus in this manner assuring a uniform cutting action with the result that the blades at the cutting edges will be maintained sharp.

Another object of the invention is the provision of a knife or cutter of this character, wherein the proper pressure is exerted upon the blades thereof approximately midway of their extent rather than at the hub or its vicinity so that the cutting edges of the several blades will be worn down in a more even manner and at the same time the cutting edges will be held tightly pressed against the surface of the perforated plate through which is discharged the cut meat during the chopping action of the machine or chopper.

A further object of the invention is the provision of a knife or cutter of this character, wherein one cutting edge of each blade is cut away, preferably the advance edge of said knife or cutter, and through the medium of a pressure member or spider associated with the knife or cutter, the cutting edges will be maintained uniformly true and pressed tightly against the perforated plate for a positive cutting action of the meat in the operation of the chopper or grinding machine and at the same time the pressure on the knife or cutter will be more evenly distributed for a positive contact at the cutting edges with the said plate.

A still further object of the invention is the provision of a knife or cutter of this character, wherein by reason of its construction and that of a pressure or spider member, these will be interfitted with each other for their application as a unit within the chopper or grinding machine.

A still further object of the invention is the provision of a knife or cutter of this character, wherein the same involves three arms, these presenting double cutting edges and in association is a hub or saddle which is adapted to fit over the top of the knife or cutter and is so shaped as to hug around the center thereof as well as enabling the lining up of the square holes in both parts so that the knife can be placed on the square part of the conveyor screw within the chopper or grinder as a unit with the said saddle, the cutting edges being of uniform width and the blades in their shape have the cutting edges at approximately right angles thereto and these cutting edges are in a plane similar to the plane of the perforated plate and present thereto wide cutting surfaces with the result that more perfect cutting operation is assured in the use of the knife or cutter.

A still further object of the invention is the provision of a knife or cutter of this character, which is simple in its construction, thoroughly reliable and efficient in operation, being of three-armed formation assures an equal pressure at each arm and such pressure being less against the perforated plate and assures minimum power in the operation of the chopper or grinding machine, strong, durable and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary side elevation of a food chopper showing the knife or cutter constructed in accordance with the invention applied and such chopper being partly shown in section for the sake of clearness.

Figure 2 is an enlarged fragmentary vertical section taken on the line 2—2 of Figure 3.

Figure 3 is a fragmentary sectional view taken on the line 3—3 of Figure 2.

Figure 4 is a sectional view taken on the line 4—4 of Figure 5 looking in the direction of the arrows.

Figure 5 is a plan view of the cutter per se.

Similar reference characters indicate corresponding parts throughout the several views in the drawing.

Referring to the drawing in detail, particularly Figure 1, A designates generally a portion of a food chopper, more commonly known as meat grinders, and comprises a cylinder 10 being supported from a standard 11, only a portion thereof being shown, and this body 10 is formed with an upstanding hopper 12 while working within the body is the feed worm 13, being conventional, and is rotated by a hand crank, a portion thereof being indicated at 14. This hand crank 14 is separably fastened to the worm by a clamping screw 15, being also conventional.

The worm 13 has associated therewith a stud 16, being journaled centrally in a perforated plate 17, which is counterseated in the open end of the body 10 and separably held in this position by a clamping cap 18 which is threaded on the outer end of the barrel or body 10. The stud 16 rotates with the worm 13 as is usual and is formed with a squared portion 19 for the engagement thereon of a knife or cutter, which constitutes the present invention and is hereinafter fully described.

The knife or cutter comprises a three-arm member 20, which is cut and bent from a single blank of sheet steel, and the arms 21 are outwardly tapered and of substantially half circular arch formation to present dual cutting blades to each of said arms and also double cutting edges 22, the blades of each arm being of uniform thickness so that the cutting edges 22 are similarly of uniform width in their extent while one of these blades 22 is cut into to form a vacancy 23 or a gap at the cutting edge 22 companion thereto. Centrally of the member 20 is a square hole 24 accommodating the square portion 19 of the stud 16 for the separable fitting of the knife or cutter upon said stud between the worm 13 and the plate 17 with the cutting edges 22 making contact with the inner face of said plate 17. The vacancies 23 in the blades 21 are inward with respect to the outer ends of said arms or blades 21.

Adapted to crown the center portion or the hub area of the knife or cutter, that is to say, the member 20 is a pressure spider or saddle 25, it being shaped or formed correspondingly to the arched formation of the arms 21 for straddling these arms and extending over the same to a point approximately centrally with respect to the vacancy 23 in the blades created by said arms 21.

The spider or saddle 25 is formed with a squared center opening 26 for registry with the opening 24 in the member 20. The opening 26 accommodates the squared portion 19 of the stud 16 and such saddle or spider 25 is arranged between the knife or cutter body 20 and the worm 13, being susceptible of interfitting with the knife or cutter and in this manner enables these parts as a unit to be applied to the stud 16 for engagement with the squared portion 19 thereof.

The knife or cutter body 20 with the cutting edges 22, by reason of the vacancies 23, assures to the three arms 21 of the member 20 a three-point contact with the plate 17, that is to say, each arm effects a three-point contact thereof with the said plate and in this fashion an even distribution of pressure and a true contact is had between the knife or cutter and the plate 17 with the result that even wear of the cutting edges 22 is assured. Also these cutting edges 22, in the operation of the knife or cutter, will be maintained sharp for the clean cutting operation of the chopper or grinding machine.

The spider or saddle strengthens and reinforces the arms 21 of the knife or cutter and at the same time assures of even distribution of pressure thereon in the working of the chopper or grinding machine.

What is claimed is:

A cutter for a food chopper having a cylinder, a worm in said cylinder, a perforated disc stationarily fitting said cylinder next to the worm, comprising a hub for fitting the worm for turning therewith, a plurality of outwardly tapered substantially half circular arch formations on said hub and extending radially therefrom to provide dual cutting blades to each of said formations and also double cutting edges companion to the said blades, the blades being of uniform thickness with respect to each other, one cutting edge of each dual cutting blade being cut into medially thereof to effect a gap in the said cutting edge, and a saddle between the hub and the worm and having portions extending over the double cutting blades to points adjacent to the gaps, the said saddle at the extensions thereof being shaped correspondingly to the arch formations, the said saddle being for maintaining three-point contact of the cutting edges of the blades with the perforated disc on the turning of the worm.

WILLIAM R. RUSH.
RAYMOND W. RUSH.